United States Patent [19]

Murata et al.

[11] Patent Number: 5,149,771
[45] Date of Patent: Sep. 22, 1992

[54] LIQUID CRYSTAL-ALIGNING FILM AND A LIQUID CRYSTAL DISPLAY ELEMENT

[75] Inventors: Shizuo Murata; Minoru Nakayama, both of Ichiharashi, Japan

[73] Assignee: Chisso Corporation, Japan

[21] Appl. No.: 631,449

[22] Filed: Dec. 21, 1990

[30] Foreign Application Priority Data

Jan. 25, 1990 [JP] Japan .................................. 2-15747

[51] Int. Cl.$^5$ ........................................... C08G 69/26
[52] U.S. Cl. .................................. 528/353; 525/431; 528/340; 528/38; 528/26; 528/28
[58] Field of Search .................... 525/431; 528/26, 28, 528/353, 340, 38

[56] References Cited

U.S. PATENT DOCUMENTS

| | | | |
|---|---|---|---|
| 3,247,199 | 2/1966 | Marxer | 995/61 |
| 4,681,928 | 7/1987 | Berger et al. | 528/38 |
| 4,748,228 | 5/1988 | Shoji et al. | 528/353 |
| 4,914,182 | 4/1990 | Pfeifer et al. | 528/353 |
| 4,959,437 | 9/1990 | Kunimune et al. | 528/38 |
| 5,026,823 | 6/1991 | Summers et al. | 528/353 |
| 5,053,544 | 10/1991 | Murata et al. | 564/430 |

FOREIGN PATENT DOCUMENTS 0389092 2/1990 European Pat. Off.

OTHER PUBLICATIONS

Korshak et al "Cardo Polymer", Reviews in Macromolecular Chemistry, 12, 1974/1975 pp. 100 to 129.

Primary Examiner—John C. Bleutge
Assistant Examiner—Margaret W. Glass
Attorney, Agent, or Firm—Leydig, Voit & Mayer

[57] ABSTRACT

A liquid crystal-aligning film affording a high pretilt angle and capable of realizing a liquid crystal display for STN mode having a superior display quality and a liquid crystal display element including such film are provided, which film comprises as its main component, a polyimide having a structural unit expressed by the formula

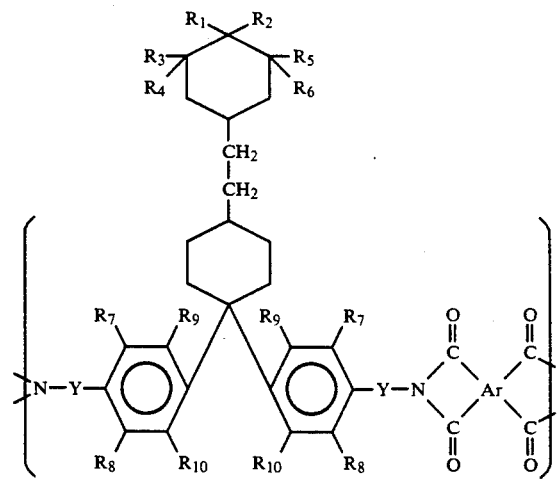

wherein
$R_1$ to $R_6$ each are H or 1-22C alkyl and may be the same as or different from one another,
Y is

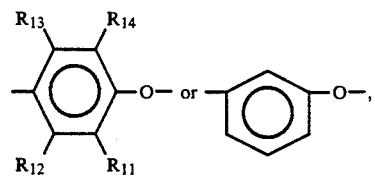

$R_7$ to $R_{14}$; each are H or 1-3C alkyl and may be the same as or different from one another and Ar is a tetravalent aromatic group.

13 Claims, No Drawings

LIQUID CRYSTAL-ALIGNING FILM AND A LIQUID CRYSTAL DISPLAY ELEMENT

BACKGROUND OF THE INVENTION

1. Field of the Invention

This invention relates to improvement in a liquid crystal-aligning film of a polyether imide having superior liquid crystal-aligning properties and a high and controllable pretilt angle.

2. Description of the Related Art

As to liquid crystal display elements used for watches, electronic calculates, etc., a twisted nematic (hereinafter abbreviated to TN) mode exhibiting a structure having the aligning direction of nematic liquid crystal molecules twisted by 90° between a pair of upper and lower electrode substrates, has currently been employed as a main current. However, as to this display mode, when it is applied to a high duty drive, the contrast is inferior due to cross-talk and the angle of view is narrow; hence it has been unsatisfactory for improving the display quality and the display surface. Recently, a liquid crystal display device making use of a super-twisted birefringence effect has been announced (T. J. Scheffer and J. Nethring, Appl. Phys. Lett., 45 (10), 1021 (1984)). Since then, a liquid crystal display element making use of a super-twisted nematic mode (hereinafter abbreviated to STN) having the aligning direction of nematic liquid crystal molecules twisted by 180° to 300° between the upper and lower electrode substrates has been developed; thus even in the case of a liquid crystal display element affording a large pictorial surface, those having a satisfactory display quality have come to be developed. In the case of an aligning film used for such elements, it is necessary to afford a definite angel (hereinafter abbreviated to pretilt angle) between the substrate planes and the liquid crystal molecules, in order to not only align the liquid crystal molecules, but also to improve response properties and ensure the bistability. Further it is preferred that the larger the twist angle, the larger the pretilt angle. Among these elements, in the case of those having a relatively small twist angle (180° to 200° twist), the interface treatment on the electrode substrates is sufficient with a cell provided with an aligning film having an interface of a currently generally employed pretilt angle (abbreviated to θ) of 5° or less. However, in the case of those elements using a mode having a twist angle of 210° to 300° wherein they exhibit a better display quality, it is necessary to use an interface of a higher pretilt angle ($5° < \theta \leq 30°$); thus a liquid crystal display cell provided with an aligning film satisfying such a pretilt angle is necessary.

In the case of currently used aligning films of polyimides for a TN mode, display cells prepared on the commercial scale have a pretilt angle limited to 5°.

Japanese patent application laid-open No. Sho 61-240223 discloses a liquid crystal display element provided with a liquid crystal-aligning film using a polyimide resin having a repetitive unit expressed by the formula

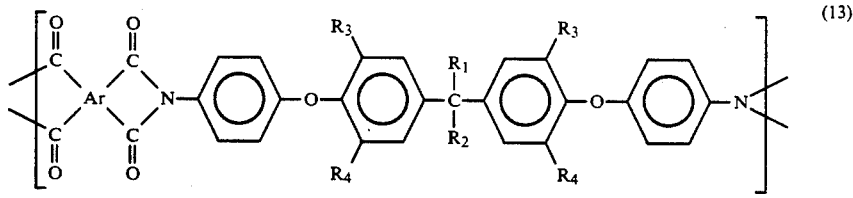

Further, as a raw material for the unit, a concrete example of a diamine expressed by the formula

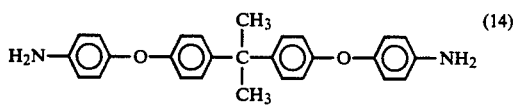

is disclosed therein.

However, the polyimide aligning film obtained using this diamino compound has a drawback that no high pretilt angle is obtained as illustrated in a comparative example mentioned later. Further, polyimide aligning films having a high pretilt angle for a STN mode also exist, but they still have a problem in the aspect of the stability and reproducibility of the pretilt angle over the total area of the cell substrate having a broad display area.

European patent application laid-open No. 0389092 (filed by the same applicants as those of the present application) discloses a liquid crystal-aligning coating composed mainly of a polymer containing in its molecular chain, a substituted or non-substituted cyclohexylidene group expressed by the formula

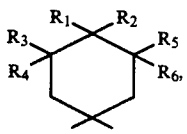

and also suggests as an example of the above formula, a formula wherein the above $R_1$ represents the following formula and the above $R_2$ to $R_6$ each represent a hydrogen atom:

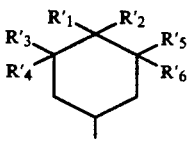

wherein $R'_1$ to $R'_6$ each represent a hydrogen atom or an alkyl group of 1 to 15 carbon atoms.

However, polyimide-aligned films composed mainly of polymers containing the groups expressed by the above formulas have a considerably improved pretilt angle, which, however, is still insufficient. In order to obtain a high pretilt angle with certainty, a thin film formation by means of an oblique vacuum deposition with $SiO_2$, etc. is the best method among those currently carried out.

However, the thin film formation by the vacuum deposition, when carried out by a commercial mass production, is more costly in terms of production apparatus; thus, it has been earnestly desired to obtain a superior liquid crystal alignment and a high pretilt angle by an interface treatment carried out by rubbing a thin film of an organic substance in the same manner as used in a conventional TN mode, and to realize the stability and reproducibility of the pretilt angle.

SUMMARY OF THE INVENTION

The object of the present invention is to provide a liquid crystal-aligning film consisting of a thin film of an organic substance and affording superior liquid crystal-aligning properties and a high pretilt angle by a rubbing treatment, and a liquid crystal display element provided with the liquid crystal-aligning film.

In particular, the object of the present invention is to provide a liquid crystal-aligning film affording a higher pretilt angle than that in the above European patent application-laid-open No. 0389092.

The liquid crystal-aligning film and the liquid crystal display element of the present invention have the following constitutions 1) to 9):

1) A liquid crystal-aligning film comprising as its main component, a high molecular weight polymer containing in its long chain, a substituted-cyclohexyle-thylcyclohexylidene group or cyclohexylethylcyclohexylidene group expressed by the formula

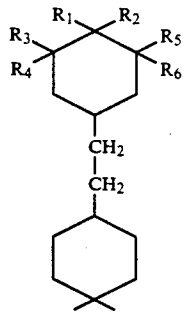   (1)

wherein $R_1$ to $R_6$ each represent a hydrogen tom or an alkyl group of 1 to 22 carbon atoms and may be the same as or different from one other.

2) A liquid crystal-aligning film comprising as its main component, a polyimide having a structural unit expressed by the formula

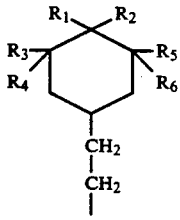   (2)

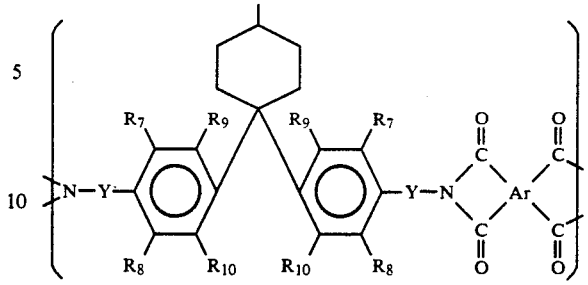

wherein $R_1$ to $R_6$ each represent a hydrogen atom or an alkyl group of 1 to 22 carbon atoms and may be the same as or different from one another, Y represents

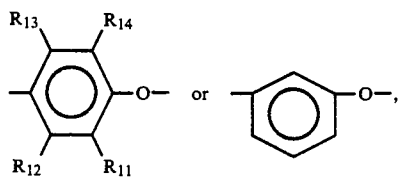

$R_7$ to $R_{14}$ each represent a hydrogen atom or an alkyl group of 1 to 3 carbon atoms and may be the same as or different from one another and Ar represents a tetravalent aromatic group.

3) A liquid crystal-aligning film according to item 2) wherein said Y represents

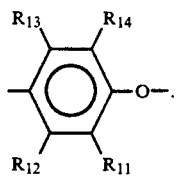

4) a liquid crystal-aligning film according to item 2) wherein said Y represents

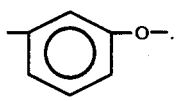

5) A liquid crystal-aligning film according to item 2), comprising as its main component, a polyimide formed by reacting a tetracarboxylic cianhydride expressed by the following formula (3) with a diamino compound expressed by the following formula (4) and/or the following formula (5) in a solvent, followed by heating the resulting polyamic acid:

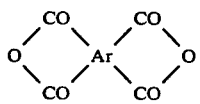   (3)

-continued

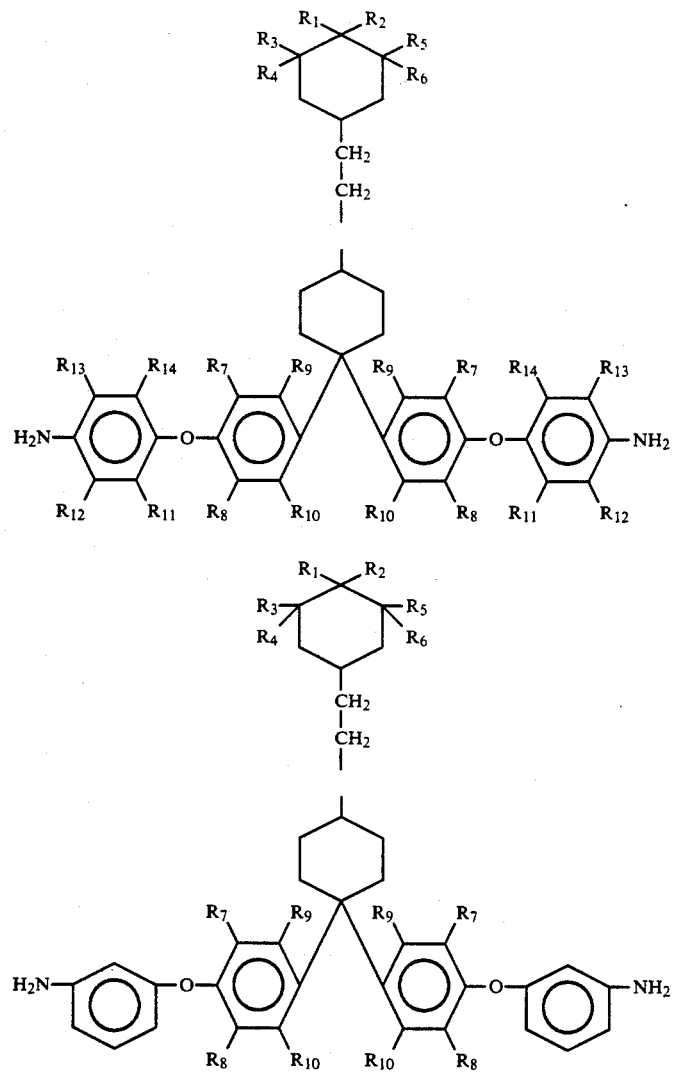

wherein $R_1$ to $R_6$ each represent a hydrogen atom or an alkyl group of 1 to 22 carbon atoms and may be the same as or different from one another, $R_7$ to $R_{14}$ each represent hydrogen atom or an alkyl group of 1 to 3 carbon atoms and may be the same as or partly or totally different from one another and Ar represents a tetravalent aromatic group.

6) a liquid crystal-aligning film according to item 2), comprising as its main component, a polyimide formed by reacting a tetracarboxylic dianhydride expressed by the following formula (3), with a diamino compound expressed by the following formula (4) and/or the following formula (5) and the following silicon compound expressed by the formula (6) in a solvent, followed by heating the resulting polyamic acid:

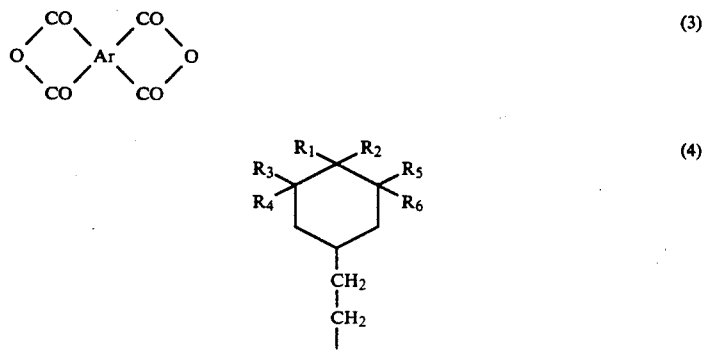

-continued

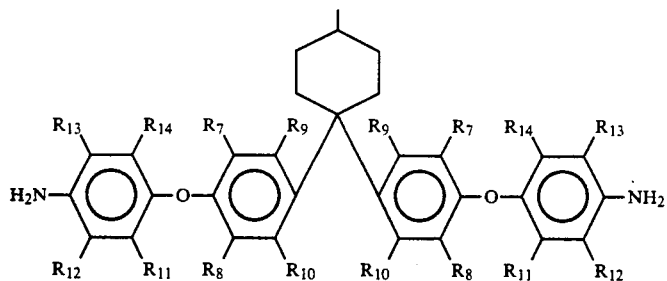

(5)

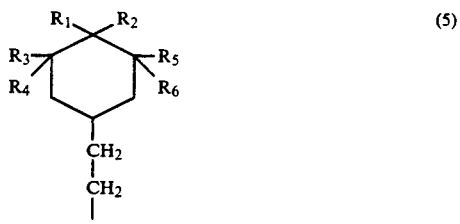

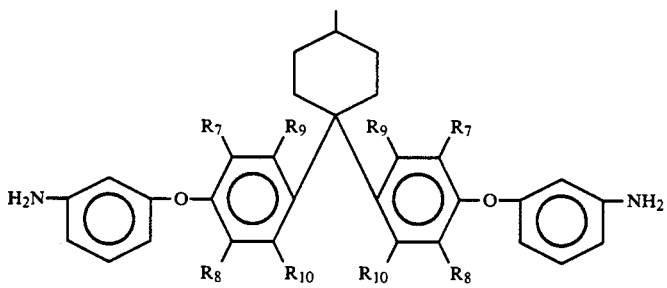

$NH_2-Z-Si(OR_{15})_m(R_{17})_n$ (6)

wherein $R_1$ to $R_6$ each represent a hydrogen atom or an alkyl group of 1 to 22 carbon atoms and may be the same as or different from one another, $R_7$ to $R_{14}$ each represent a hydrogen atom or an alkyl group of 1 to 3 carbon atoms and may be the same as or different from one another, Ar represents a tetravalent aromatic group, Z represents an alkylene group of 2 to 10 carbon atoms or a phenylene group, $n=0$ or 1 and $m+n=3$, and $R_{15}$ and $R_{17}$ each independently represents an alkyl group of 1 to 10 carbon atoms.

7) a liquid crystal-aligning film according to item 2), comprising as its main component, a polyimide formed by reacting a tetracarboxylic dianhydride expressed by the following formula (3) with a diamino compound expressed by the following formula (4) and/or the following formula (5) in a solvent, followed by reacting the resulting reaction material with the following silicon compound expressed by the formula (6) and heating the resulting polyamic acid:

(3)

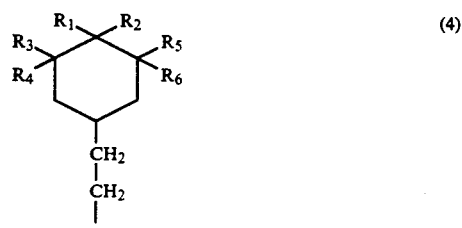

(4)

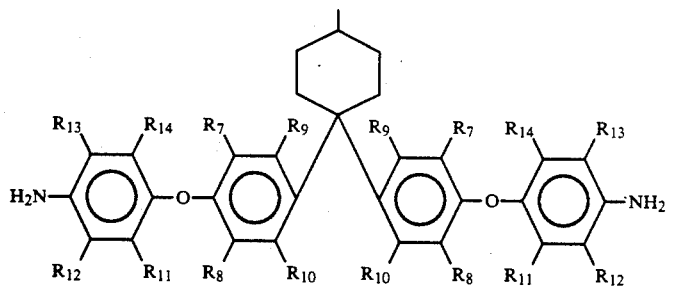

(5)

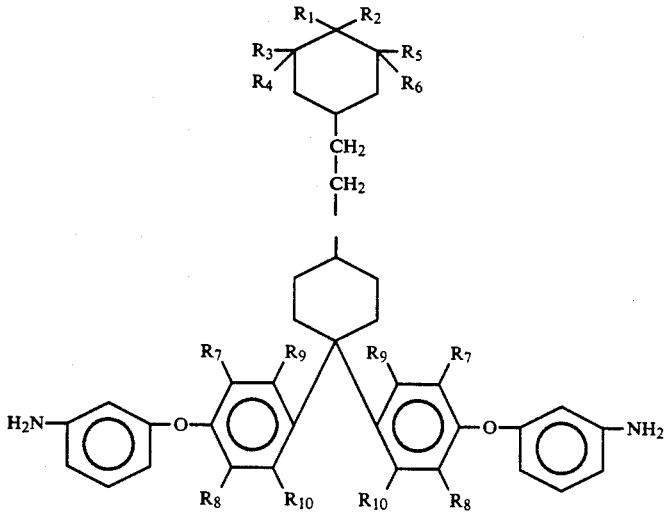

NH₂—Z—Si(OR₁₅)$_m$(R₁₇)$_n$ (6)

wherein $R_1$ to $R_6$ each represent a hydrogen atom or an alkyl group of 1 to 22 carbon atoms and may be the same as or different from one another, $R_7$ to $R_{14}$ each represent a hydrogen atom or an alkyl group of 1 to 3 carbon atoms and may be the same as or different from one another, Ar represents a tetravalent aromatic group, Z represents an alkylene group of 2 to 10 carbon atoms or a phenylene group, n=0 or 1 and m+n=3, and $R_{15}$ and $R_{17}$ each independently represents an alkyl group of 1 to 10 carbon atoms.

8) A liquid crystal-aligning film comprising as its main component, a substituted imide group expressed by the formula

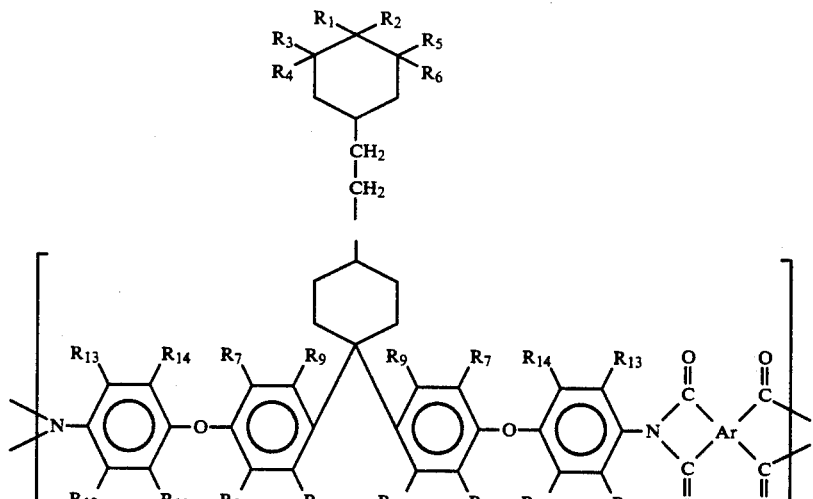

—Z—Si(OR₁₅)$_m$(R₁₇)$_n$ (8)

wherein $R_1$ to $R_6$ each represent hydrogen atom or an alkyl group of 1 to 22 carbon atoms and may be the same as or partly or totally different from one another, $R_7$ to $R_{14}$ each represent a hydrogen atom or an alkyl group of 1 to 3 carbon atoms and may be the same as or different from one another, Ar represents a tetravalent aromatic group, Z represents an alkylene group of 2 to 10 carbon atoms or a phenylene group, $n=0$ r 1 and $m+n=3$, and $R_{15}$ and $R_{17}$ each independently represents an alkyl group of 1 to 10 carbon atoms.

9) A liquid crystal display element containing a liquid crystal-aligning film as set forth in item 1).

10) A liquid crystal display element containing a liquid crystal-aligning film as set forth in item 2).

DETAILED DESCRIPTION OF PREFERRED EMBODIMENTS

In the liquid crystal-aligning film of the present invention, examples of the high molecular weight polymer referred to in the above item 1) are aromatic polyimides, polyether imides, polyamides, polyesters, polyethers, polysulfones, polysulfides, polyphenylenes, polycarbonates, etc.

The formation of the liquid crystal-aligning film of the present invention will be illustrated in more detail referring to polyether imides.

Polyether imides are generally insoluble in solvents. Thus, in order to provide a uniform high molecular polymer film of polyether imides as a liquid crystal-aligning film on a substrate, a process is preferred wherein a polyamic acid as a precursor of the polyether imides, obtained usually by condensing a tetracarboxylic dianhydride with a diamino compound is dissolved in a solvent such as N-methyl-2-pyrrolidone (NMP), dimethylacetamide (DMAc), dimethylformamide (DMF), dimethylsulfoxide (DMSO), etc., followed by coating the resulting solution onto a substrate according to a coating method such as a brushing method, dipping method, rotating-coating method, spray coating method, printing methods, etc., subjecting the coated material to heat treatment at 100° to 450° C., preferably 180° to 290° C. to effect dehydration-ring closure reaction and thereby afford imide bond.

The polyamic acid as a precursor of the above polyether imides is usually prepared by condensing a tetracarboxylic dianhydride with a diamino compound, as described above. The condensation reaction thereof is carried out under anhydrous condition, in a solvent such as N-methyl-2-pyrrolidone (NMP), dimethylacetamide (DMAc), dimethylformamide (DMF), dimethylsulfoxide (DMSO), dimethyl sulfate, sulfolane, butyrolactone, cresol, phenol, halogenated phenols, cyclohexane, dioxane, tetrahydrofuran, etc., preferably N-methyl-2-pyrrolidone (NMP), at 50° C. or lower. It is generally suitable for the polyamic acid to have a viscosity at room temperature ($\eta_{20}$) of 10 to 10,000 cps when dissolved in 10% by weight of NMP. If the viscosity is lower than 10 cps, the time required for its preparation is too long. Particularly when the resulting reaction solution contains a silicone compound, it gels, which is undesirable, while if the viscosity exceeds 10,000 cps, it is difficult due to too high a viscosity to uniformly and thinly coat the solution onto the substrate. However, in the case where the solubility of polyether imide high molecular weight polymer in a solvent raises no problem, the above materials may be reacted at a high temperature prior to coating onto the substrate, followed by using the resulting polyether imide in the form of a varnish.

Concrete examples of the diamino compound of the present invention, expressed by the above formula (4), are as follows:

1,1-bis[4-(4-aminophenoxy)phenyl]-4-(2-cyclohexylethyl)cyclohexane
1,1-bis[4-(4-aminophenoxy)phenyl]-4-[2-(trans-4-methylcyclohexyl)ethyl]cyclohexane
1,1-bis[4-(4-aminophenoxy)phenyl]-4-[2-(trans-4-ethylcyclohexyl)ethyl]cyclohexane
1,1-bis[4-(4-aminophenoxy)phenyl]-4-[2-(trans-4-n-propylcyclohexyl)ethyl]cyclohexane
1,1-bis[4-(4-aminophenoxy)phenyl]-4-[2-(trans-4-n-butylcyclohexyl)ethyl]cyclohexane
1,1-bis[4-(4-aminophenoxy)phenyl]-4-[2-(trans-4-n-pentylcyclohexyl)ethyl]cyclohexane
1,1-bis[4-(4-aminophenoxy)phenyl]-4-[2-(trans-4-n-hexylcyclohexyl)ethyl]cyclohexane
1,1-bis[4-(4-aminophenoxy)phenyl]-4-[2-(trans-4-n-heptylcyclohexyl)ethyl]cyclohexane
1,1-bis[4-(4-aminophenoxy)phenyl]-4-[2-(trans-4-n-octylcyclohexyl)ethyl]cyclohexane
1,1-bis[4-(4-aminophenoxy)phenyl]-4-[2-(trans-4-n-nonylcyclohexyl)ethyl]cyclohexane
1,1-bis[4-(4-aminophenoxy)phenyl]-4-[2-(trans-4-n-decylcyclohexyl)ethyl]cyclohexane
1,1-bis[4-(4-aminophenoxy)phenyl]-4-[2-(trans-4-n-undecylcyclohexyl)ethyl]cyclohexane
1,1-bis[4-(4-aminophenoxy)phenyl]-4-[2-(trans-4-n-dodecylcyclohexyl)ethyl]cyclohexane
1,1-bis[4-(4-aminophenoxy)phenyl]-4-[2-(trans-4-n-tridecylcyclohexyl)ethyl]cyclohexane
1,1-bis[4-(4-aminophenoxy)phenyl]-4-[2-(trans-4-n-tetradecylcyclohexyl)ethyl]cyclohexane
1,1-bis[4-(4-aminophenoxy)phenyl]-4-[2-(trans-4-n-pentadecylcyclohexyl)ethyl]cyclohexane
1,1-bis[4-(4-aminophenoxy)phenyl]-4-[2-(trans-4-n-hexadecylcyclohexyl)ethyl]cyclohexane
1,1-bis[4-(4-aminophenoxy)phenyl]-4-[2-(trans-4-n-heptadecylcyclohexyl)ethyl]cyclohexane
1,1-bis[4-(4-aminophenoxy)phenyl]-4-[2-(trans-4-n-octadecylcyclohexyl)ethyl]cyclohexane
1,1-bis[4-(4-aminophenoxy)phenyl]-4-[2-(trans-4-n-nonadecylcyclohexyl)ethyl]cyclohexane Concrete examples of the tetracarboxylic dianhydride of the liquid crystal-aligning film of the present invention, expressed by the above formula (3) are as follows:

pyromellitic dianhydride,
3,3',4,4'-biphenyltetracarboxylic dianhydride,
2,2',3,3'-biphenyltetracarboxylic dianhydride,
2,3,3',4'-biphenyltetracarboxylic dianhydride,
3,3',4,4'-benzophenonetetracarboxylic dianhydride,
2,3,3',4'-benzophenonetetracarboxylic dianhydride,
2,2',3,3'-benzophenonetetracarboxylic dianhydride,
bis(3,4-dicarboxyphenyl) ether dianhydride,
bis(3,4-dicarboxyphenyl)sulfone dianhydride,
1,2,5,6-naphthalenetetracarboxylic dianhydride,
2,3,6,7-naphthalenetetracarboxylic dianhydride, etc.

In the liquid crystal-aligning film of the present invention, those obtained by introducing an aminosilicon compound or a diaminosilicon compound into the polyether imide, concretely the liquid crystal-aligning films having the substituted imide group expressed by the above formula (8), have a higher adhesion to the substrate.

Further, a liquid crystal-aligning film containing, as its main component, the structural units expressed by the formula (2) and also containing a structural unit expressed by the following formula (12) in 0.1 to 50% by weight, preferably 0.1 to 30% by weight, is exemplified:

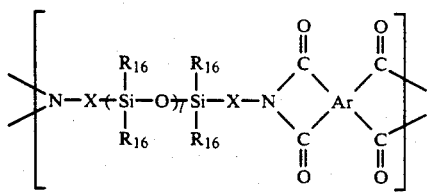 (12)

wherein X represents an alkylene group of 1 to 3 carbon atoms or a phenylene group, $R_{16}$ represents an alkyl group of 1 to 6 carbon atoms, Ar represents a tetravalent aromatic group and l represents an integer of 0 to 4.

Concrete examples of the aminosilicon compound of the liquid crystal-aligning film of the present invention, expressed by the above formula (6), are as follows:

$NH_2-(CH_2)_3-Si(OCH_3)_3$
$NH_2-(CH_2)_3-Si(OC_2H_5)_3$
$NH_2-(CH_2)_3-Si(CH_3)(OCH_3)_2$
$NH_2-(CH_2)_3-Si(CH_3)(OC_2H_5)_2$
$NH_2-(CH_2)_3-Si(C_2H_5)(On-C_3H_7)_2$
$NH_2-(CH_2)_2-Si(OCH_3)_3$
$NH_2-(CH_2)_2-Si(OC_2H_5)_3$
$NH_2-(CH_2)_4-Si(CH_3)(OC_2H_5)_2$

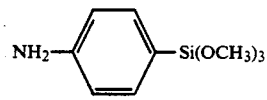

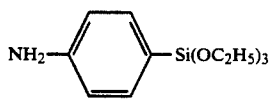

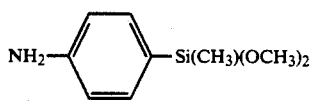

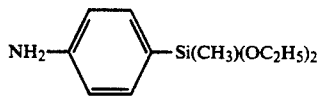

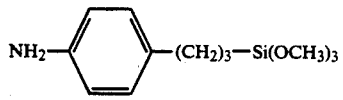

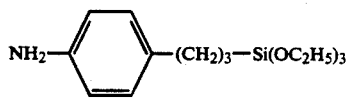

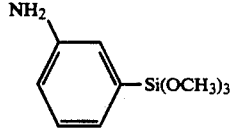

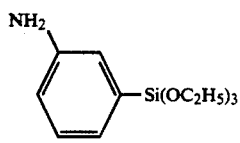

When these aminosilicon compounds are introduced into the polyether imide high molecular weight substance, the content of the compounds is preferred to fall within the range satisfying the following expressions among those of the polyether imide raw materials:

$$1 \leq \frac{C}{A-B} \leq 2 \text{ and } 0.1 \leq \frac{C}{B+C}$$

wherein A represents the number of mols of a tetracarboxylic dianhydride, B represents that of diamino compound(s) expressed by the formulas (4) or/and (5) and C represents that of an aminosilicon compound.

Further, examples of the aminosilicon compound for forming the structural unit expressed by the formula (12) are as follows:

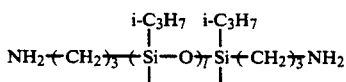

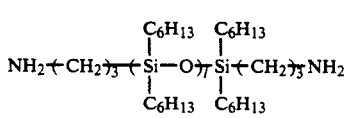

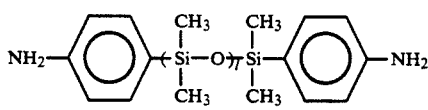

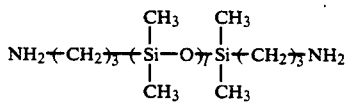

wherein
l represents an integer of 0 to 4, and
when the aminosilicon compound is introduced into the polyether imide high molecular weight substance, 50 molar % or less, preferably 30 molar % or, of the diamino compound expressed by the above formulas (4) or (5) may be replaced by a diaminosilicon compound.

The polyether imide in the liquid crystal-aligning film of the present invention may be modified by introducing an aromatic diamino compound, an alicyclic diamino compound or derivatives of the foregoing in addition to the above-mentioned components into the polyether imide.

Concrete examples of such compounds are as follows: aromatic diamino compounds such as
4,4'-diaminophenyl ether,
4,4'-diaminodiphenylmethane,
4,4'-diaminodiphenyl sulfone,
4,4'-diaminodiphenyl sulfide,
4,4'-di(meta-aminophenoxy)diphenyl sulfone,
4,4'-di(para-aminophenoxy)diphenyl sulfone,
ortho-phenylenediamine,
meta-phenylenediamine,
para-phenylenediamine,
benzidine,
2,2'-diaminobenzophenone,
4,4'-diaminobenzophenone,
4,4'-diaminodiphenyl-2,2'-propane,
1,5-diaminonaphthalene,
1,8-diaminonaphthalene, etc., and alicyclic diamino compounds such as 1,4-diaminocyclohexane, etc.

For providing the liquid crystal-aligning film of the present invention on a substrate, a process is preferred wherein a polyamic acid obtained by condensing a tetracarboxylic dianhydride with a diamino compound, as a precursor for the polyether imide, is coated on a substrate, followed by heat treatment to effect a dehydration reaction and thereby form a polyimide high molecular weight film on the substrate. The above process will be described below in more detail. The polyamic acid is dissolved in a solvent such as N-methyl-2-pyrrolidone (NMP), dimethylacetamide (DMAc), dimethylformamide (DMF), dimethylsulfoxide (DMSO) or the like to prepare a 0.1 to 30% by weight solution, preferably a 1 to 10% by weight solution, followed by coating this solution onto a substrate according to a brushing method, dipping method, rotation-coating method, spray method, printing method or the like to form a film thereon, followed by subjecting the resulting material to heat treatment at 100° to 450° C., preferably 180° to 290° C., to effect a dehydration-ring closure reaction and thereby provide a liquid crystal-aligning film consisting of a polyether imide high molecular weight film. If the adhesion of the high molecular weight film onto the substrate is inferior, the surface of the substrate is subjected in advance to a surface treatment with a silane coupling agent, followed by forming the high molecular weight film thereon to thereby improve the adhesion, and rubbing the resulting coated surface with a cloth or the like in one direction to obtain a liquid crystal alignment-controlling film.

As to the substrate, an electrode, specifically a transparent electrode of ITO (indium oxide-tin oxide), tin oxide or the like has been usually formed on the substrate. Further, in order to prevent an alkali from dissolving from the substrate to the lower surface of the electrode, an undercoat film such as insulating film, polarizing sheet, color filter or the like may be formed under the electrode, and an overcoat film such as an insulating film, color filter film, film for preventing light from transmitting, etc. may be formed on the electrode. Further, such an electrode may be made up into a two-layer structure by the medium of an insulating film. Still further, an active element such as TFT (thin film transistor), non-linear resistant element or the like may be formed. As to the constitution inside the cell, of such electrode, undercoat or others, constitution of conventional liquid crystal elements may be employed.

Using the thus formed substrate, a cell is formed, followed by filling a liquid crystal therein and sealing the pouring inlet. As such a liquid crystal to be sealed, various liquid crystals such as not only conventional nematic liquid crystals but also liquid crystals having a dichroic dyestuff added therein, or the like, may be used.

The liquid crystal element of the present invention is characterized by being provided with an alignment-controlling film capable of realizing superior aligning properties and a high pretilt angle i.e. a liquid crystal-aligning film of the present invention, and is usually composed of substrate(s), a voltage-impressing means, an alignment-controlling film, a liquid crystal layer, etc.

(EXAMPLES)

The present invention will be described in more detail by way of examples, but it should not be construed to be limited thereto.

Measurement of the pretilt angle is carried out by rubbing a polyimide high molecular film provided on the substrates of a liquid crystal element according to the above-mentioned means, by means of a rubbing device (a liquid crystal cell rubbing device made by Iinuma Gauge Co., Ltd.), in one direction, followed by setting up a liquid crystal element so that the cell thickness may be about 20 μm, and the surfaces of electrodes may be parallel in the rubbing direction and opposed to each other, measuring the electric capacity and calculating the pretilt angle therefrom.

EXAMPLE 1

Into a 200 ml capacity four-necked flask provided with a stirrer, a thermometer, a condenser and a nitrogen gas-purging means were fed dehydrated and purified N-methyl-2-pyrrolidone (60 ml), and then 1,1-bis[4-(4-aminophenoxy)phenyl]-4-[2-(trans -4-n-pentylcyclohexyl)ethyl]cyclohexane (10.43 g), followed by dissolving these with stirring, cooling the resulting solution down to 13° C., at a time feeding pyromellitic dianhydride (4.12 g), reacting the mixture with stirring and under cooling, adding p-aminophenyltrimethoxysilane (0.91 g) one hour after the reaction, reacting the mixture with stirring at 20° C. for one hour, and diluting the reaction solution with N-methyl-2-pyrrolidone (NMP) (75 ml) to obtain a 10% by weight transparent solution of a polyamic acid having a viscosity at 25° C. of 155 cps as measured at a temperature of 25°±0.1° C. by means of an E type viscometer made by Tokyo Keiki Co., Ltd., diluting the solution with a mixed solution of butyl cellosolve with N-methyl-2-pyrrolidone (1:1) into a 3% by weight solution, coating this solution onto a transparent glass substrate provided with an ITO transparent electrode on one surface of the substrate according to a rotation coating method (spinner process) under rotation conditions of 2500 rpm and 20 seconds, drying at 100° C. for 10 minutes, and subjecting the resulting material to heat treatment at 200° C. for 90 minutes in an oven, to obtain a polyether imide film of 700 Å thickness, subjecting the respective coated surfaces of two sheets of the substrates having the polyether imide film formed thereon to rubbing treatment to obtain a liquid crystal-aligning film, setting up a liquid crystal cell of a cell thickness of 20 μm so that the surfaces of the respective films might be parallel in the rubbing direction and opposed to each other, placing liquid crystals ZLI 1132 made by Merck Co., Ltd. in the cell, heating the resulting material up to an isotropic liquid temperature and gradually cooling it to obtain a liquid crystal element. This liquid crystal element exhibited superior aligning properties and the pretilt angle of this liquid crystal measured according to the above-mentioned measurement method of pretilt angle was 20°.

EXAMPLE 2

Example 1 was repeated except that 1,1-bis[4-(4-aminophenoxy)phenyl]-4-[2-(trans-4-n-pentylcyclohexyl)ethyl]cyclohexane of Example 1 was replaced by 1,1-bis-[4-(4-aminophenoxy)phenyl]-4-[2-(trans-4-n-heptylcyclohexyl)ethyl)]cyclohexane to obtain a 10% by weight solution of a polyamic acid having a viscosity of 145 cps, followed by diluting, coating and heat-treating this solution in the same manner as in Example 1 to obtain a polyether imide film of about 1,100 Å thickness.

Two sheets of the substrates having a polyether imide formed thereon were each made up into a substrate having a liquid crystal-aligning film in the same manner as in Example 1, followed by preparing a liquid crystal element having a cell thickness of 20 μm and placing liquid crystals ZLI-1132 made by Merck Co., Ltd. in the liquid crystal element. The resulting liquid crystal element exhibited superior aligning properties and a pretilt angle of 15.3°.

COMPARATIVE EXAMPLE 1

2,2-Bis[4-(4-aminophenoxy)phenyl]propane (24.92 g), pyromellitic anhydride (15.16 g) and p-aminophenyltrimethoxysilane (3.36 g) ere polymerized at 5° to 10° C. using N-methyl-2-pyrrolidone (380.3 ml) as solvent to obtain a solution of a polyamic acid (10% by weight, $\eta_{20}=113$ cps), followed by diluting this solution with a mixed solvent of N-methyl-2-pyrrolidone (one part) and butyl cellosolve (one part) to a 3% solution, coating this solution under coating conditions of a revolution number of 3,000 rpm and 20 seconds according to a rotation-coating method (spinner method), preheating the resulting material at 100° C. for 10 minutes, heat-treating at 200° C. for one hour to obtain a polyether imide film of about 600 Å thickness, subjecting the film to rubbing treatment to prepare a liquid crystal-aligning film and setting up a liquid crystal cell in the same manner as in Example 1 to obtain a liquid crystal element. This element exhibited a pretilt angle of 5°.

Effectiveness of the Invention

According to the present invention, it is possible to easily obtain a liquid crystal-aligning film having a high tilt angle. This high tilt angle is easily obtained by subjecting a polyether imide high molecular weight film having a structural unit expressed by the above formula (2) to rubbing treatment; hence the film is suitable for preparing liquid crystal elements on a commercial scale. Further, the pretilt angle is variable by varying the alkyl chain length of $R_1$ to $R_6$ in the formula (2).

When the liquid crystal-aligning film of the present invention is used, it is possible to realize a liquid crystal display for STN mode having a superior display quality.

What we claim is:

1. A liquid crystal-aligning film comprising as its main component, a high molecular weight polymer containing in its long chain, a substituted-cyclohexylethylcyclohexylidene group or cyclohexylethylcyclohexylidene group expressed by the formula

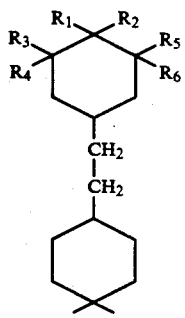
(1)

wherein $R_1$ to $R_6$ each represent a hydrogen atom or an alkyl group of 1 to 22 carbon atoms and may be the same as or different from one other.

2. A liquid crystal-aligning film comprising as its main component, a polyimide having a structural unit expressed by the formula

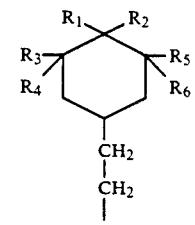
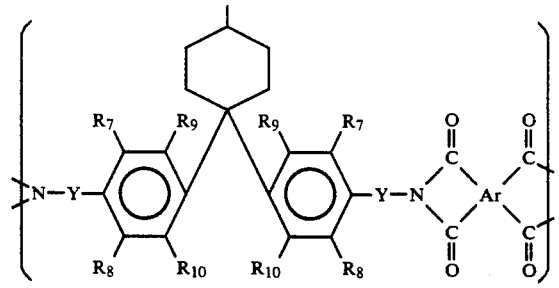
(2)

wherein $R_1$ to $R_6$ each represent a hydrogen atom or an alkyl group of 1 to 22 carbon atoms and may be the same as or different from one another, Y represents

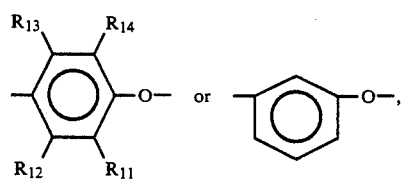

$R_7$ to $R_{14}$ each represent a hydrogen atom or an alkyl group of 1 to 3 carbon atoms and may be the same as or different from one another and Ar represents a tetravalent aromatic group.

3. A liquid crystal-aligning film according to claim 2, wherein said Y represents

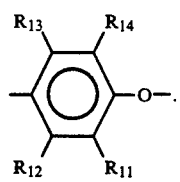

4. A liquid crystal-aligning film according to claim 2, wherein said Y represents

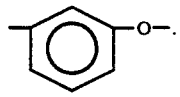

5. A liquid crystal-aligning film according to claim 2 comprising as its main component, a polyimide formed by reacting a tetracarboxylic dianhydride expressed by the following formula (3) with a diamino compound expressed by the following formula (4) and/or the following formula (5) in a solvent, followed by heating the resulting polyamic acid:

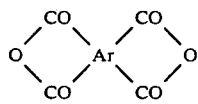
(3)

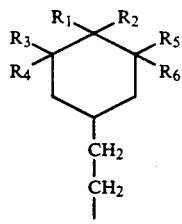
(4)

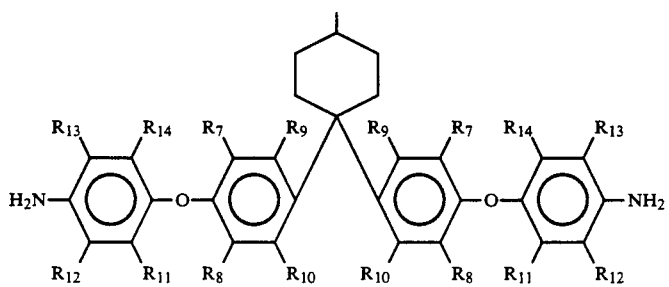

(5)

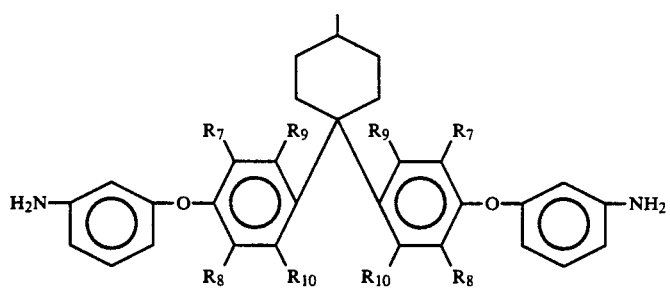

wherein $R_1$ to $R_6$ each represent a hydrogen atom or an alkyl group of 1 to 22 carbon atoms and may be the same as or different from one another, $R_7$ to $R_{14}$ each represent a hydrogen atom or an alkyl group of 1 to 3 carbon atoms and may be the same as or different from one another and Ar represents a tetravalent aromatic group.

6. A liquid crystal-aligning film according to claim 2 comprising, as its main component, a polyimide formed by reacting a tetracarboxylic dianhydride expressed by the following formula (3) with a diamino compound expressed by the following formula (4) and/or the following formula (5) and the following silicon compound expressed by the formula (6) in a solvent, followed by heating the resulting polyamic acid:

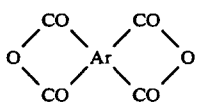
(3)

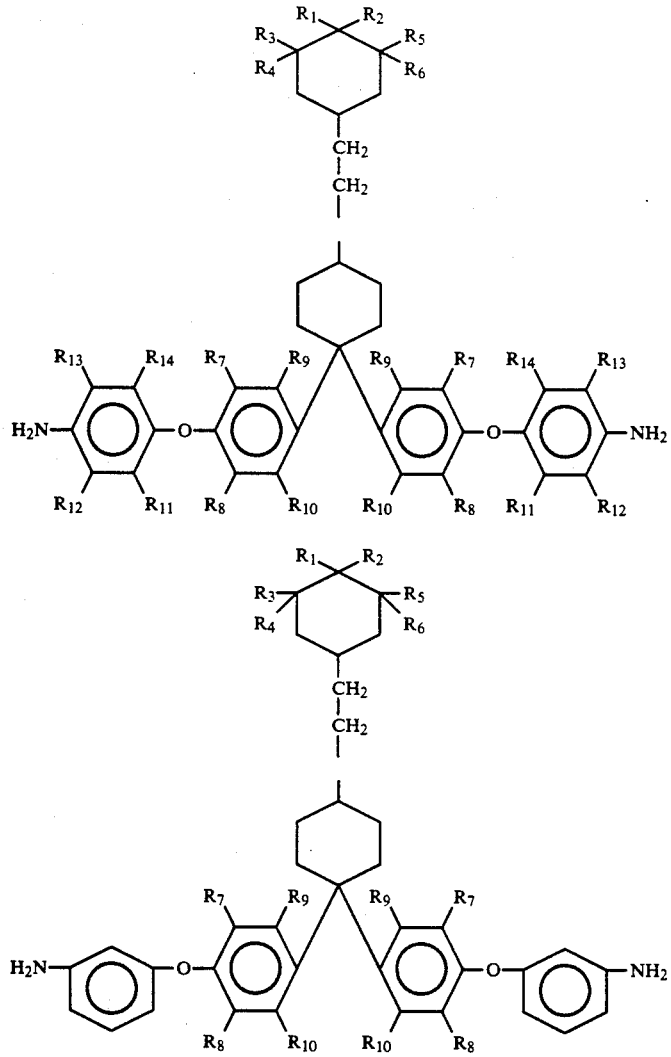

$$NH_2-Z-Si(OR_{15})_m(R_{17})_n \quad (6)$$

wherein $R_1$ to $R_6$ each represent a hydrogen atom or an alkyl group of 1 to 22 carbon atoms and may be the same as or different from one another, $R_7$ to $R_{14}$ each represent a hydrogen atom or an alkyl group of 1 to 3 carbon atoms and may be the same as or different from one another, Ar represents a tetravalent aromatic group, Z represents an alkylene group of 2 to 10 carbon atoms or a phenylene group, $n=0$ or 1, $m+n=3$ and $R_{15}$ and $R_{17}$ each independently represents an alkyl group of 1 to 10 carbon atoms.

7. A liquid crystal-aligning film according to claim 2 comprising, as its main component, a polyimide formed by reacting a tetracarboxylic dianhydride expressed by the following formula (3) with a diamino compound expressed by the following formula (4) and/or the following formula (5) in a solvent, followed by reacting the resulting reaction material with the following silicon compound expressed by the formula (6) and heating the resulting polyamic acid:

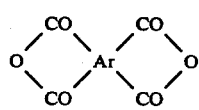

(3)

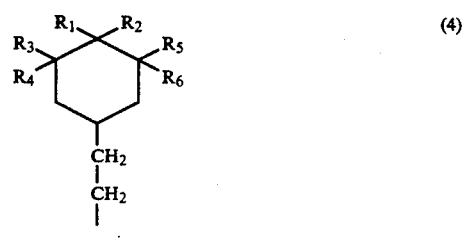

(4)

-continued

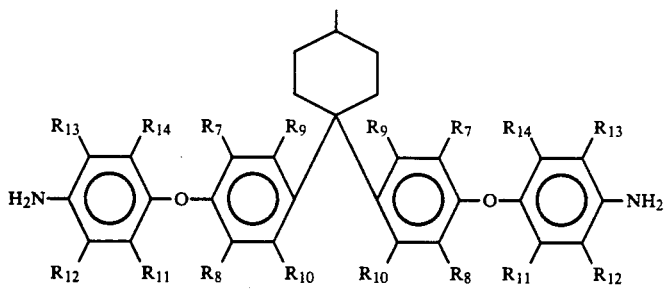

(5)

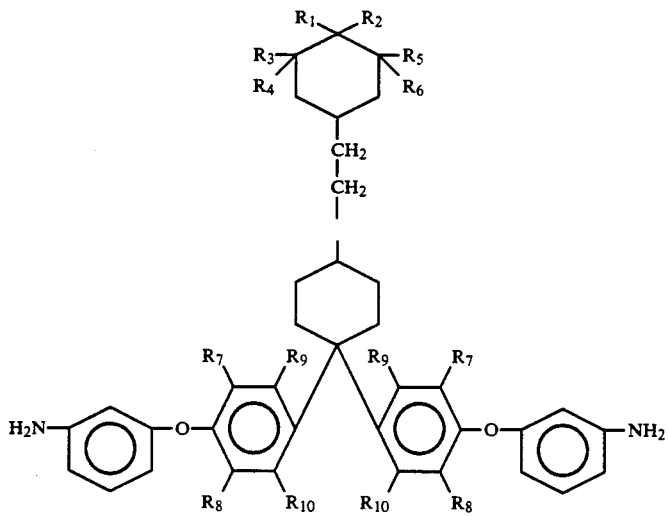

$NH_2-Z-SI(OR_{15})_m(R_{17})_n$ (6)

wherein $R_1$ to $R_6$ each represent a hydrogen atom or an alkyl group of 1 to 22 carbon atoms and may be the same as or different from one another, $R_7$ to $R_{14}$ each represent a hydrogen atom or an alkyl group of 1 to 3 carbon atoms and may be the same as or different from one another, Ar represents a tetravalent aromatic group, Z represents an alkylene group of 2 to 10 carbon atoms or a phenylene group, n=0 or 1, m+n=3 and $R_{15}$ and $R_{17}$ each independently represents an alkyl group of 1 to 10 carbon atoms.

8. A liquid crystal-aligning film comprising as its main component, a substituted imide group expressed by the formula

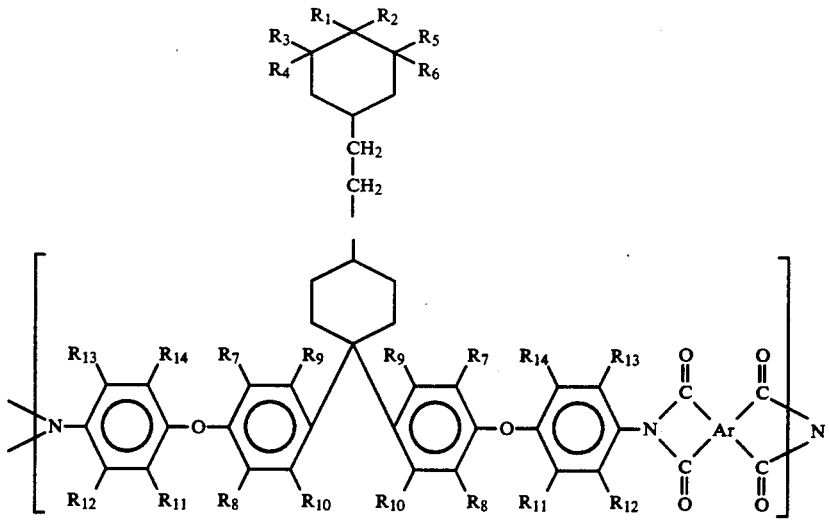

$-Z-Si(OR_{15})_m(R_{17})_n$ (8)

wherein $R_1$ to $R_6$ each represent a hydrogen atom or an alkyl group of 1 to 22 carbon atoms and may be the same as or different from one another, $R_7$ to $R_{14}$ each represent a hydrogen atom or an alkyl group of 1 to 3 carbon atoms and may be the same as or different from one another, Ar represents a tetravalent aromatic group, Z represents an alkylene group of 2 to 10 carbon atoms or a phenylene group, $n=0$ or 1, $m+n=3$ and $R_{15}$ and $R_{17}$ each independently represents an alkyl group of 1 to 10 carbon atoms.

9. A liquid crystal display element containing a liquid crystal-aligning film as set forth in claim 1.

10. A liquid crystal display element containing a liquid crystal-aligning film as set forth in claim 2.

11. A liquid crystal-aligning film according to claim 6 wherein $R_{15}$ contains 1 to 3 carbon atoms and $R_{17}$ contains 1 or 2 carbon atoms.

12. A liquid crystal-aligning film according to claim 7 wherein $R_{15}$ contains 1 to 3 carbon atoms and $R_{17}$ contains 1 or 2 carbon atoms.

13. A liquid crystal-aligning film according to claim 8 wherein $R_{15}$ contains 1 to 3 carbon atoms and $R_{17}$ contains 1 or 2 carbon atoms.

* * * * *